United States Patent
Barnette et al.

(10) Patent No.: US 9,063,733 B2
(45) Date of Patent: Jun. 23, 2015

(54) MANAGING POWER MODES OF A COMPUTING SYSTEM

(75) Inventors: Jamaica L. Barnette, Durham, NC (US); Paul M. Smith, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 336 days.

(21) Appl. No.: 13/285,363

(22) Filed: Oct. 31, 2011

(65) Prior Publication Data

US 2013/0111243 A1    May 2, 2013

(51) Int. Cl.
G06F 1/00    (2006.01)
G06F 1/32    (2006.01)
G06F 1/28    (2006.01)

(52) U.S. Cl.
CPC ............... *G06F 1/3231* (2013.01); *G06F 1/28* (2013.01); *Y02B 60/1289* (2013.01)

(58) Field of Classification Search
USPC ................................. 710/300–340; 711/170
See application file for complete search history.

(56) References Cited

U.S. PATENT DOCUMENTS

| | | | |
|---|---|---|---|
| 5,911,081 A * | 6/1999 | Whatley et al. | 713/320 |
| 6,014,747 A * | 1/2000 | Fackenthall et al. | 726/34 |
| 7,162,656 B2 | 1/2007 | Vogman | |
| 7,418,608 B2 | 8/2008 | Kumar et al. | |
| 7,669,071 B2 | 2/2010 | Cochran et al. | |
| 7,739,527 B2 * | 6/2010 | Rothman et al. | 713/320 |
| 2004/0268166 A1 * | 12/2004 | Farkas et al. | 713/320 |
| 2005/0268134 A1 * | 12/2005 | Park | 713/324 |
| 2008/0168287 A1 * | 7/2008 | Berry et al. | 713/323 |
| 2009/0119523 A1 | 5/2009 | Totten | |
| 2010/0169690 A1 | 7/2010 | Mundada et al. | |
| 2010/0257379 A1 * | 10/2010 | Wang et al. | 713/300 |
| 2011/0010566 A1 | 1/2011 | Bandholz et al. | |

FOREIGN PATENT DOCUMENTS

| | | |
|---|---|---|
| JP | 2009-118728 A | 5/2009 |
| WO | WO 2006/082599 A2 | 8/2006 |

OTHER PUBLICATIONS

Hughes et al., "Blade Center processor Blades, I/O expansion adapters, and units", IBM Journal of Research and Development, ISSN: 0018-8646, 2005, pp. 837-859, vol. 49, N°6, International Business Machines, Armonk, NY.

* cited by examiner

*Primary Examiner* — Tim T Vo
*Assistant Examiner* — Kim T. Huynh
(74) *Attorney, Agent, or Firm* — Edward J. Lenart; Katherine S. Brown; Kennedy Lenart Spraggins LLP (57) ABSTRACT

Managing power modes of a computing system that includes a power supply and computing components, the power supply configured to supply power, through power supply channels, to the computing components, wherein power modes are managed by: operating the computing system in a performance power mode, including allowing each power channel to consume power greater than a predefined maximum power consumption threshold; receiving a signal representing a user's access to the computing components; and operating the computing system in a safety mode, insuring that each of the power supply channels does not consume power greater than the predefined maximum power consumption threshold, including: throttling power consumption of one or more of the computing components; monitoring power consumption of each power supply channel; and shutting down the computing system when at least one power supply channel consumes power greater than the predefined maximum power consumption threshold.

19 Claims, 4 Drawing Sheets

MANAGING POWER MODES OF A COMPUTING SYSTEM

BACKGROUND OF THE INVENTION

1. Field of the Invention

The field of the invention is data processing, or, more specifically, methods, apparatus, and products for managing power modes of a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computing system become more complex and the number of components of the systems increase, the power requirements for each computing system also increases. In fact, power requirements for some components are so high today that user safety has become a concern. When, for example, a user accesses the interior computing components of a computing system, while the computing system is powered, power supply lines may carry a large amount of current. So large so, that a user may be harmed if physical contact occurs. To that end, Underwriters Laboratories ('UL') has set a standard for safety in which power supply lines accessible by non-electricians may provide no more than 240 VA. For users that operate may computing systems at one time—in a data center, for example—the cost, in money and time, of hiring a licensed electrician is often too great. As such, most users require 240 VA standards to be employed in each computing system. To that end, many computing systems are configured with multiple 240 VA channels. As systems have become more powerful, the number of these channels have grown exponentially. As the number of these channel increases, the cost and complexity of implementing the system increases and inefficiency increases due to available power be limited.

SUMMARY OF THE INVENTION

Methods, apparatus, and products for managing power modes of a computing system are disclosed in this specification. The computing system includes a power supply and a plurality of computing components, where the power supply is configured to supply power, through a plurality of power supply channels, to the computing components. Managing power modes includes: operating, by a power control unit, the computing system in a performance power mode, including allowing each power channel to consume power greater than a predefined maximum power consumption threshold; receiving, by the power control unit, a signal representing a user's access to the computing components; and operating, by the power control unit, the computing system in a safety mode, insuring that each of the power supply channels does not consume power greater than the predefined maximum power consumption threshold, including: throttling, by the power control unit, power consumption of one or more of the computing components; monitoring, by the power control unit, power consumption of each power supply channel; and shutting down the computing system when at least one power supply channel consumes power greater than the predefined maximum power consumption threshold.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
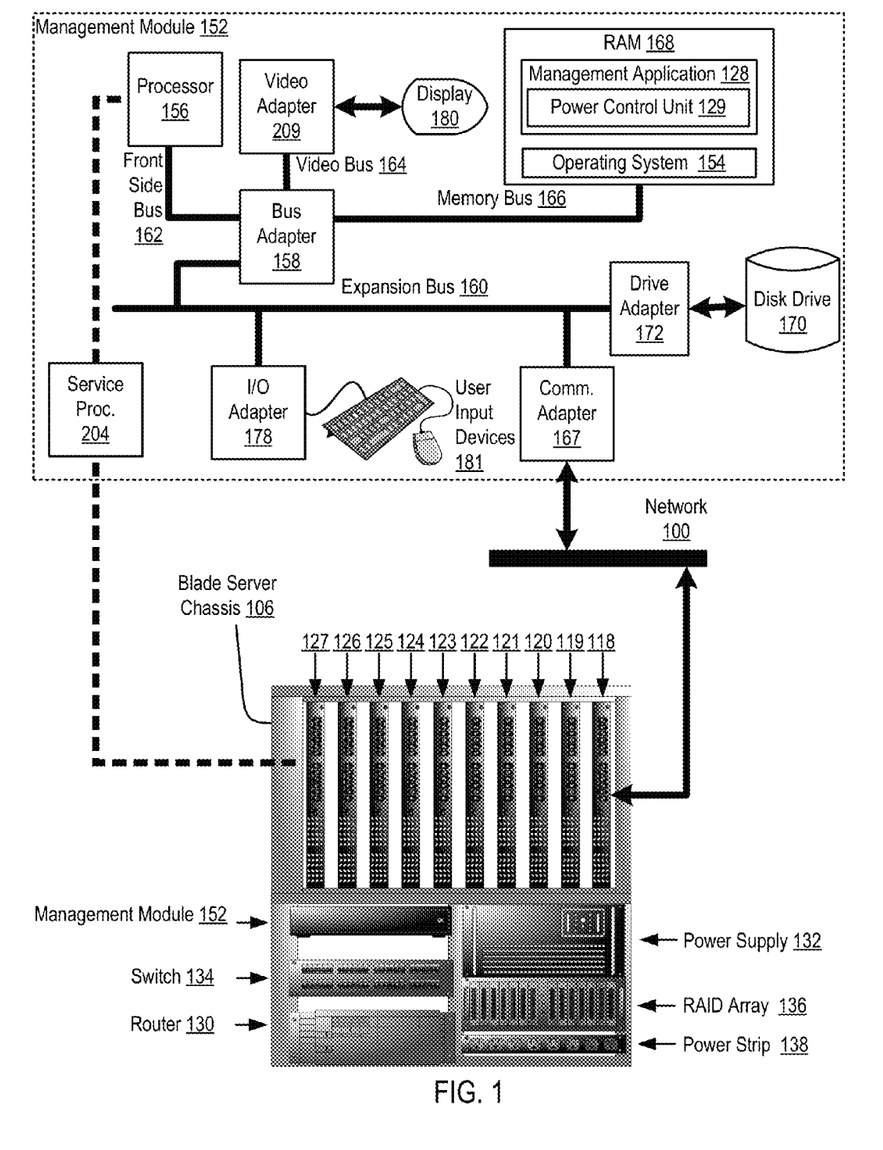
FIG. 1 sets forth a system for managing power modes of a computing system according to embodiments of the present invention.

Exemplary methods, apparatus, and products for managing power modes of a computing system in accordance with the present invention are described with reference to the accompanying drawings, beginning with FIG. 1. FIG. 1 sets forth a system for managing power modes of a computing system according to embodiments of the present invention. The system of FIG. 1 includes a multi-server chassis in the form of a blade server chassis (106). A blade server chassis is an enclosure in which blade servers as well as other electrical components are installed. The chassis provides cooling for servers, data communications networking connections, input/output device connections, power connections, and so on as will occur to those of skill in the art. One example blade server chassis is IBM's BladeCenter. An IBM BladeCenter E includes 14 blade slots, a shared media tray with an optical drive, floppy drive, and Universal Serial Bus ('USB') port, one or more management modules, two or more power supplies, two redundant high speed blowers, two slots for Gigabit Ethernet switches, and two slots for optional switch or pass-through modules such as Ethernet, Fibre Channel, InfiniBand or Myrient 2000 modules.

The example blade server chassis (106) of Figure includes ten blade servers (118-127). A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade server chassis (DC power) virtualized (iSCSI storage, remote console over IP), or discarded entirely (serial ports). The blade itself becomes simpler, smaller, and amenable to dense installation with many blade servers in a single blade server chassis.

In addition to the blade servers (109-127), the blade server chassis (104, 106) in the example of FIG. 1 also house several other electrical components including a power supply (132), a data communications router (130), a switch (134) a RAID array (136), a power strip (138) and a management module (152).

A management module is an aggregation of computer hardware and software that is installed in a server chassis to provide support services for computing devices, such as blade servers. Support services provided by the management module (152) include monitoring health of computing devices and reporting health statistics to a system management server, power management and power control, save and restore configurations, discovery of available computing devices, event log management, memory management, and so on. An example of a management module that can be adapted for use in systems that manage power modes of a computing system in accordance with the present invention includes IBM's Advanced Management Module ('AMM').

In the example of FIG. 1, a functional block diagram of the management module (152) is depicted. The management module (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a management application (128), a module of computer program instructions for provide support services for computing devices, such as blade servers. The management application (128) also includes a power control unit (129), a module of computer program instructions that, when executed, cause the management module (152) to manage power modes of a computing system in accordance with embodiments of the present invention. The term 'computing system' as used in FIG. 1 refers to any combination of a computing components, power supply, and power control unit. In the example of FIG. 1, a computing system may be implemented as a combination of a blade server, its power supply, and the power control unit.

A power mode, as the term is used in this specification, refers to a mode of computing system operation related to power consumption of components within a computing system. Power is provided to the components of the computing system by a power supply (132) through a plurality of power supply channels. Each power supply channel provides power to a different set of components, even though a single power supply provides power to all power supply channels.

The power control unit (129) switches the computing system between the power modes. That is, the power control unit is configured to operate the a computing system in one of several modes: in a performance power mode in which the each power channel may consume power greater than a predefined maximum power consumption threshold and in a safety mode in which the power control unit insures that each of the power supply channels does not consume power greater than the predefined maximum power threshold. In the safety mode, the power control unit (129) may throttle power consumption of one or more of the computing components; monitor power consumption of each power supply channel; and shut down the computing system when at least one power supply channel consumes power greater than the predefined maximum power consumption threshold. The power control unit (129) may effect such throttling, monitoring, and shutting down through various means of a data communications between the management module (152) and the computing system (e.g. the blade servers). For example, the power control unit (129) may effect throttling, monitoring, and shutting down with data communications from the management module (152) and the computing system via a service processor (204) and out-of-band data communications links or via the in-band data communications network (100).

In some embodiments the predefined maximum threshold of the safety mode is 240 VA (Volt-Amp). If any single channel exceeds 240 VA, the power control unit (129) shuts down the computing system. The 240 VA threshold relates to a generally accepted safety standard set forth by Underwriters Laboratory ('UL'). The 240 VA safety standard generally states that unless a powered system is regulated to consume no more power than 240 VA, a licensed electrician is required for physical access the powered system. That is, any person other than a licensed electrician is forbidden physical access to the powered system.

The power control unit (129) is configured to switch from the performance power mode to the safety mode upon receiving a signal representing a user's access to the computing components. In some embodiments, the computing system is housed in a chassis and the chassis includes a safety cover and a switching mechanism activated upon opening of the safety cover. The power control unit (129) may receive a signal representing a user's access to the computing components by sensing the switching mechanism's activation upon the user opening the safety cover. In this way, the power control unit enables the computing system to operate above 240 VA when no user is accessing the computing system and operate below 240 VA when a user is actually accessing the computing system.

Although the power control unit (129) is depicted in the example system of FIG. 1 as a module of computer program instructions, readers of skill in the art will recognize that the power control unit (129) may also be implemented as a module of computer hardware, an FPGA, an ASIC for example, or a service processor for example. Moreover, the power control unit (129) may not be implemented as part of a management module. Instead, the power control unit (129) may be implemented in as a computing component within a computing device, as a module of the power supply, or in other ways as will occur to readers of skill in the art.

Also stored in RAM (168) is an operating system (154). Operating systems useful in computers that manage power modes of a computing system according to embodiments of the present invention include UNIX™, Linux™, Microsoft XP™, AIX™, IBM's i5/OS™, and others as will occur to those of skill in the art. The operating system (154), management application (128), and power control unit (129) in the example of FIG. 1 are shown in RAM (168), but many components of such software typically are stored in non-volatile memory also, such as, for example, on a disk drive (170).

The management module (152) of FIG. 1 includes disk drive adapter (172) coupled through expansion bus (160) and bus adapter (158) to processor (156) and other components of the management module (152). Disk drive adapter (172) connects non-volatile data storage to the management module (152) in the form of disk drive (170). Disk drive adapters useful in management modules that manage power modes of a computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example management module (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example management module (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary management module (152) of FIG. 1 includes a communications adapter (167) for data communications with other computers (118-127) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in systems that manage power modes of a computing system according to embodiments of the present invention include modems for wired dial-up communications, Ethernet (IEEE 802.3) adapters for wired data communications network communications, and 802.11 adapters for wireless data communications network communications.

The arrangement of servers, chassis, routers, power supplies, management modules, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
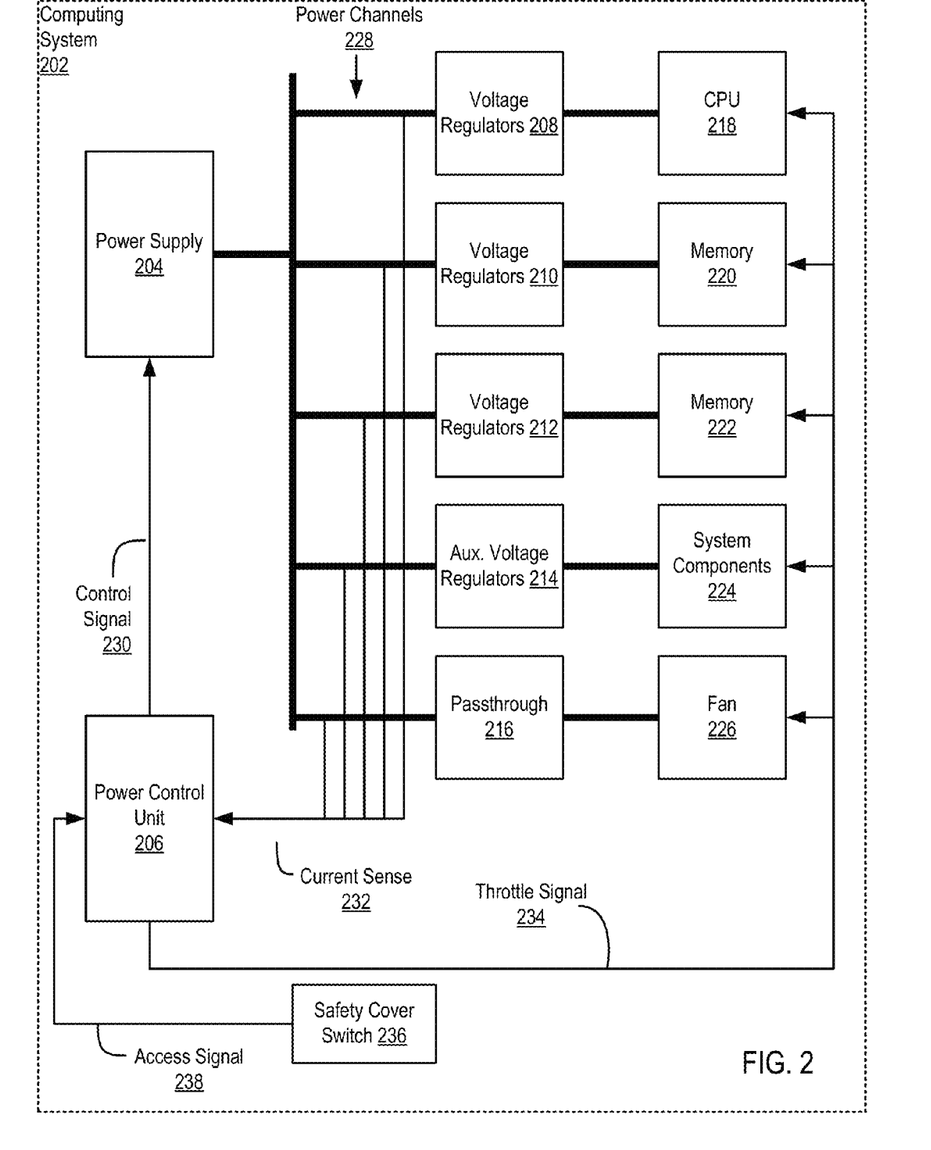
FIG. 2 sets forth a block diagram of an exemplary computing system for which power modes are managed in accordance with embodiments of the present invention.

For further explanation, FIG. 2 sets forth a block diagram of an exemplary computing system for which power modes are managed in accordance with embodiments of the present invention. The example computing system (202) of FIG. 2 includes a power supply (204) and a plurality of computing components (218, 220, 222, 224, 226). Specifically, the computing system (202) includes a computer processor (218), memory (220), memory (222), other system components (224), and a fan (226). The power supply (204) is configured to supply power, through a plurality of power supply channels (228), voltage regulators (208, 210, 212, 214) and passthrough circuitry (216), to the computing components (218, 220, 222, 224, 226).

The example computing system (202) of FIG. 2 also includes a power control unit (206) which is configured to operate the computing system (202) in a performance power mode by allowing each power channel (228) to consume power greater than a predefined maximum power consumption threshold. In some embodiments, the power control unit (206), during the performance power mode, may also monitor current draw of each power supply channel (228) through current sense signals (232) and, upon detecting an overcurrent condition in at least one power supply channel, and shutting down the computing system. Such a shut down may be effected by various including, for example, by through the control signal (230) coupling the power control unit (206) to the power supply (204).

'Shutting down' the computing system in this specification may be implemented in a variety of ways. One way, for example, is to put the computing system into an 'S5' power state in accordance with Advance Configuration and Power Interface ('ACPI') standard. The ACPI standard provides an open standard for device configuration and power management by operating systems. The ACPI standard specifies various power states, including the following seven states (so-called global states) for an ACPI-compliant computer-system:

G0 (S0): Working
G1(S1-S4): Sleeping
  S1: All processor caches are flushed, and the CPU(s) stop executing instructions. Power to the CPU(s) and RAM is maintained; devices that do not indicate they must remain on may be powered down.
  S2: CPU powered off
  S3: Commonly referred to as Standby, Sleep, or Suspend to RAM. RAM remains powered
  S4: Hibernation or Suspend to Disk. All content of main memory is saved to non-volatile memory such as a hard drive, and is powered down.
G2 (S5), Soft Off: G2 is almost the same as G3 Mechanical Off, but some components remain powered so the computer can "wake" from input from the keyboard, clock, modem, LAN, or USB device.
G3, Mechanical Off: The computer's power consumption approaches close to zero, to the point that the power cord can be removed and the system is safe for disassembly (typically, only the real-time clock is running off its own small battery).

In the example of FIG. 2, the computing system (202) is housed in a chassis that includes a safety cover and a switching mechanism (236) that is activated upon opening of the safety cover. Upon the safety cover being opened while the computing system (202) operates in the performance power mode, the power control unit (206) receives a signal (238) representing a user's access to the computing components by sensing the switching mechanism's (236) activation.

Upon receipt of the access signal (238), the power control unit (206) switches power modes of the computing system, operating the computing system in a safety mode. In the safety mode, the power control unit (206) insures that each of the power supply channels (228) does not consume power greater than the predefined maximum power consumption threshold. The power control unit (206) when switching the computing system (202) to the safety mode throttles power consumption of one or more of the computing components (218, 220, 222, 224, 226), and monitors power consumption of each power supply channel (228). In some embodiments, the power control unit (206) throttles one or more computer processors o the computing system (202). The power control unit (206) may commence throttling through a throttle signal (234). The power control unit (206) may effect throttling of a computing component in various ways, through direct control of the component, through direct control of other computer hardware, through indirect control via software, and in other ways as will occur to readers of skill in the art. In some embodiments, operation of the power supply itself is not directly controlled by the power control unit (206) but rather, indirectly controlled by the power control units throttling of the computing components. That is, in some embodiments, power consumption is throttled with no need to throttle power supply.

When at least one power supply channel consumes power greater than the predefined maximum power consumption threshold, the power control unit (206) shuts down the computing system when at least one power supply channel consumes power greater than the predefined maximum power consumption threshold. Again, the power control unit (206) may place the computing system (202) in and S5 state through control signals (230) between the power control unit (206) and the power supply (204).

Figure 3:
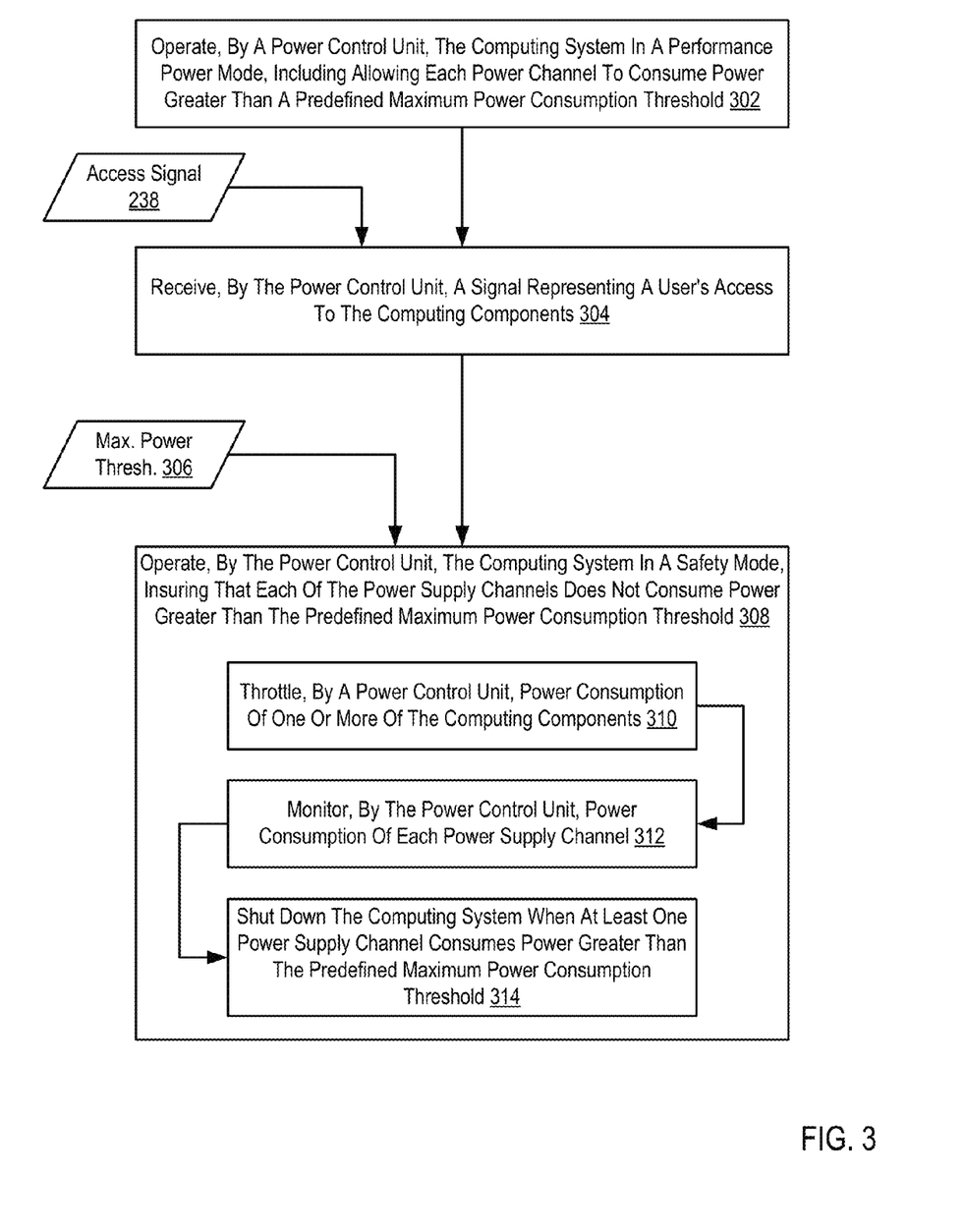
FIG. 3 sets forth a flow chart illustrating an exemplary method for managing power modes of a computing system according to embodiments of the present invention.

For further explanation, FIG. 3 sets forth a flow chart illustrating an exemplary method for managing power modes of a computing system according to embodiments of the present invention. The computing system is similar to the example computing system (202) of FIG. 2 and includes a power supply and a plurality of computing components. The power supply is configured to supply power, through a plurality of power supply channels, to the computing components.

The method of FIG. 3 includes operating (302), by a power control unit, the computing system in a performance power mode, including allowing each power channel to consume power greater than a predefined maximum power consumption threshold. Operating (302) the computing system in a performance power mode may be carried out by disabling the predefined maximum power consumption threshold and not monitoring power consumption of the power supply channels. In the performance power mode, the computing system may operate with normal ACPI power states S1-S5 as described above.

The method FIG. 3 also includes receiving (304), by the power control unit, a signal (238) representing a user's access to the computing components. In embodiments in which the computing system is housed in a chassis and the chassis includes a safety cover and a switching mechanism activated upon opening of the safety cover, receiving (304) a signal (238) representing a user's access to the computing component may include sensing the switching mechanism's activation upon the user opening the safety cover. Readers of skill in the art will recognize that receiving a signal representing a user's access may occur in a variety of other ways. For example, a computing system may include a button, a switch or some other mechanical user interface designated to generate the signal upon a user's interaction. Alternatively, a software module may be employed through which a user may request access to the system and the software module may generate and transmit the signal to the power control unit.

Upon receipt of the access signal (238), the method of FIG. 2 continues by operating (308), by the power control unit, the computing system in a safety mode, insuring that each of the power supply channels does not consume power greater than the predefined maximum power consumption threshold (306). In the method of FIG. 2, operating (308), by the power control unit, the computing system in a safety mode is carried out by throttling (310) power consumption of one or more of the computing components, monitoring (312) power consumption of each power supply channel, and shutting (314) down the computing system when at least one power supply channel consumes power greater than the predefined maximum power consumption threshold.

Figure 4:
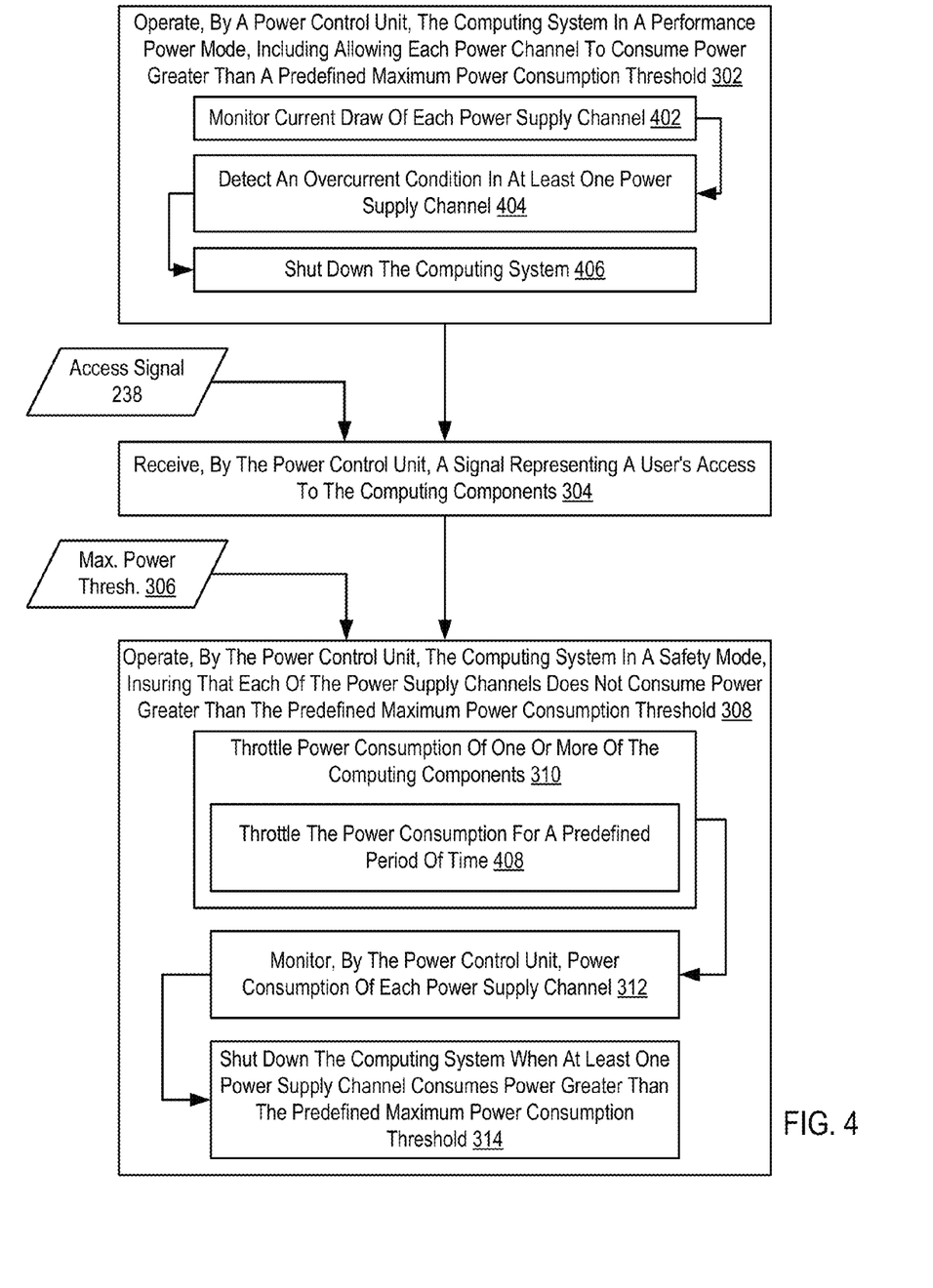
FIG. 4 sets forth a flow chart illustrating an further exemplary method for managing power modes of a computing system according to embodiments of the present invention.

For further explanation, FIG. 4 sets forth a flow chart illustrating an further exemplary method for managing power modes of a computing system according to embodiments of the present invention. The method of FIG. 4 is similar to the method of FIG. 3 in that in the method of FIG. 4, the computing system includes a power supply and a plurality of computing components. The power supply is configured to supply power, through a plurality of power supply channels, to the computing components. The method of FIG. 4 is also similar to the method of FIG. 3 in that the method of FIG. 4 includes operating (302) the computing system in a performance power mode; receiving (304) a signal representing a user's access to the computing components; and operating (308) the computing system in a safety mode, including: throttling (310) power consumption of one or more of the computing components; monitoring (312) power consumption of each power supply channel; and shutting (314) down the computing system when at least one power supply channel consumes power greater than the predefined maximum power consumption threshold.

The method of FIG. 4 differs from the method of FIG. 3 in that in the method of FIG. 4 operating (302) the computing system in a performance power mode includes: monitoring (402), by the power control unit during operation of the computing system in the performance power mode, current draw of each power supply channel; detecting (404), by the power control unit, an overcurrent condition in at least one power supply channel; and shutting (406) down the computing system. That is, even in the performance power mode where the power supply channels are allowed to consume power over the predefined maximum power consumption threshold, the power control unit provide overcurrent protection.

The method of FIG. 4 also differs from the method of FIG. 3 in that in the method of FIG. 4 throttling (310) power consumption of one or more of the computing components is carried out by throttling (408) the power consumption for a predefined period of time.

The predefined period of time may be specified as an average amount of time between a user opening a safety cover and setting a new, predetermined power consumption threshold against which the computing system operates. In this way, immediately, upon a user opening the safety cover and prior to the establishment of the predetermined power consumption threshold, the computing system is throttled, thereby protecting in the interim.

Alternatively, the predefined period of time may be specified as an amount of time that a user typically takes, on average, to open a safety cover, inspect or repair computing components, and close the safety cover. In most instances, a user's access will be complete prior to or near the expiration of the predefined period of time. After that time, throttling will cease. Even if the user continues to access the system after throttling has ceased (expiration of the predefined period of time), there is no guarantee that any one channel will exceed the predefined maximum power consumption threshold. Even if one channel does momentarily exceed the predefined maximum power consumption threshold, the power control unit is configured to immediately shut the computing system down, thereby protecting the user accessing the computing components. Further, once throttling is ceased, the computing components may perform at a higher level—even if consuming less than the predefined maximum power consumption threshold. In this way, a balance between user safety and computing system performance is provided.

In view of the explanations set forth above, readers will recognize that the benefits of managing power modes in a computing system according to embodiments of the present invention include:
  providing safety measures for users accessing high voltage computing components;
  reducing costs by enabling users other than licensed electricians to access the computing components;
  reducing complexity, and thereby cost, of circuit boards and power supply channels by reducing the number of independent channels necessary to provide safety operation; and
  increasing potential performance of computing systems (when in performance power mode) while maintaining safety requirements only when needed; and
  other benefits as will occur to readers of skill in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing power modes of a computing system, the computing system comprising a power supply and a plurality of computing components, the power supply configured to supply power, through a plurality of power supply channels, to the computing components, the method comprising:
   operating, by a power control unit, the computing system in a performance power mode, including allowing each power channel to consume power greater than a predefined maximum power consumption threshold, the predefined maximum power consumption representing specifying a user safety threshold;
   receiving, by the power control unit, a signal representing a user's physical access to the computing components via a safety cover during operation of the computing system; and
   operating, by the power control unit, the computing system in a safety mode, insuring that each of the power supply channels does not consume power greater than the predefined maximum power consumption threshold, including:
   throttling, by the power control unit, power consumption of one or more of the computing components;
   monitoring, by the power control unit, power consumption of each power supply channel; and
   shutting down the computing system when at least one power supply channel consumes power greater than the predefined maximum power consumption threshold.

2. The method of claim 1 wherein:
   throttling power consumption of the computing components further comprises throttling the power consumption for a predefined period of time.

3. The method of claim 1 wherein:
   the computing system comprises a chassis, the chassis comprises a safety cover and a switching mechanism activated upon opening of the safety cover; and
   receiving a signal representing a user's access to the computing component further comprises sensing the switching mechanism's activation upon the user opening the safety cover.

4. The method of claim 1 wherein:
   the computing components comprise a computer processor; and
   throttling power consumption of one or more of the computing components further comprises throttling utilization of the computer processor.

5. The method of claim 1 wherein:
   shutting the computing system down further comprises setting a power state of the computing system to S5 in accordance with the Advanced Configuration and Power Interface ('ACPI') standard.

6. The method of claim 1 wherein operating the computing system in a performance power mode further comprises:
   monitoring, by the power control unit during operation of the computing system in the performance power mode, current draw of each power supply channel;
   detecting, by the power control unit, an overcurrent condition in at least one power supply channel; and
   shutting down the computing system.

7. An apparatus for managing power modes of a computing system, the computing system comprising a power supply and a plurality of computing components, the power supply configured to supply power, through a plurality of power supply channels, to the computing components, the apparatus comprising a computer processor, a computer memory operatively coupled to the computer processor, the computer memory having disposed within it computer program instructions that, when executed, cause the apparatus to carry out the steps of:
   operating, by a power control unit, the computing system in a performance power mode, including allowing each power channel to consume power greater than a predefined maximum power consumption threshold, the predefined maximum power consumption representing specifying a user safety threshold;
   receiving, by the power control unit, a signal representing a user's physical access to the computing components via a safety cover during operation of the computing system; and
   operating, by the power control unit, the computing system in a safety mode, insuring that each of the power supply channels does not consume power greater than the predefined maximum power consumption threshold, including:
   throttling, by the power control unit, power consumption of one or more of the computing components;
   monitoring, by the power control unit, power consumption of each power supply channel; and
   shutting down the computing system when at least one power supply channel consumes power greater than the predefined maximum power consumption threshold.

8. The apparatus of claim 7 wherein:
   throttling power consumption of the computing components further comprises throttling the power consumption for a predefined period of time.

9. The apparatus of claim 7 wherein:
   the computing system comprises a chassis, the chassis comprises a safety cover and a switching mechanism activated upon opening of the safety cover; and
   receiving a signal representing a user's access to the computing component further comprises sensing the switching mechanism's activation upon the user opening the safety cover.

10. The apparatus of claim 7 wherein:
    the computing components comprise a computer processor; and
    throttling power consumption of one or more of the computing components further comprises throttling utilization of the computer processor.

11. The apparatus of claim 7 wherein:
    shutting the computing system down further comprises setting a power state of the computing system to S5 in accordance with the Advanced Configuration and Power Interface ('ACPI') standard.

12. The apparatus of claim 7 wherein operating the computing system in a performance power mode further comprises:
monitoring, by the power control unit during operation of the computing system in the performance power mode, current draw of each power supply channel;
detecting, by the power control unit, an overcurrent condition in at least one power supply channel; and
shutting down the computing system.

13. A computer program product for managing power modes of a computing system, the computing system comprising a power supply and a plurality of computing components, the power supply configured to supply power, through a plurality of power supply channels, to the computing components, the computer program product disposed upon a non-transitory computer readable medium, the computer program product comprising computer program instructions that, when executed, cause a computer to carry out the steps of:
operating, by a power control unit, the computing system in a performance power mode, including allowing each power channel to consume power greater than a predefined maximum power consumption threshold, the predefined maximum power consumption representing specifying a user safety threshold;
receiving, by the power control unit, a signal representing a user's physical access to the computing components via a safety cover during operation of the computing system; and
operating, by the power control unit, the computing system in a safety mode, insuring that each of the power supply channels does not consume power greater than the predefined maximum power consumption threshold, including:
throttling, by the power control unit, power consumption of one or more of the computing components;
monitoring, by the power control unit, power consumption of each power supply channel; and
shutting down the computing system when at least one power supply channel consumes power greater than the predefined maximum power consumption threshold.

14. The computer program product of claim 13 wherein:
throttling power consumption of the computing components further comprises throttling the power consumption for a predefined period of time.

15. The computer program product of claim 13 wherein:
the computing system comprises a chassis, the chassis comprises a safety cover and a switching mechanism activated upon opening of the safety cover; and receiving a signal representing a user's access to the computing component further comprises sensing the switching mechanism's activation upon the user opening the safety cover.

16. The computer program product of claim 13 wherein:
the computing components comprise a computer processor; and
throttling power consumption of one or more of the computing components further comprises throttling utilization of the computer processor.

17. The computer program product of claim 13 wherein:
shutting the computing system down further comprises setting a power state of the computing system to S5 in accordance with the Advanced Configuration and Power Interface ('ACPI') standard.

18. The computer program product of claim 13 wherein operating the computing system in a performance power mode further comprises:
monitoring, by the power control unit during operation of the computing system in the performance power mode, current draw of each power supply channel;
detecting, by the power control unit, an overcurrent condition in at least one power supply channel; and
shutting down the computing system.

19. The computer program product of claim 13 wherein the computer readable medium comprises a storage medium.

* * * * *